United States Patent
Sisco

(10) Patent No.: US 8,256,368 B2
(45) Date of Patent: Sep. 4, 2012

(54) REINFORCEMENT OF KISS-OFF IN ROTATIONALLY MOLDED WATERCRAFT

(75) Inventor: Brad Sisco, Rock Island, TN (US)

(73) Assignee: Jackson Kayak, Inc., Sparta, TN (US)

(*) Notice: Subject to any disclaimer, the term of this patent is extended or adjusted under 35 U.S.C. 154(b) by 213 days.

(21) Appl. No.: 12/771,409

(22) Filed: Apr. 30, 2010

(65) Prior Publication Data

US 2011/0265703 A1   Nov. 3, 2011

(51) Int. Cl.
*B63B 5/24* (2006.01)
(52) U.S. Cl. .............. 114/347; 114/357; 156/73.5
(58) Field of Classification Search ............ 114/347, 114/357; 156/73.5
See application file for complete search history.

(56) References Cited

U.S. PATENT DOCUMENTS

| | | | | |
|---|---|---|---|---|
| 4,407,216 A * | 10/1983 | Masters | | 114/347 |
| 4,898,295 A * | 2/1990 | Kim | | 220/613 |
| 6,546,891 B1 * | 4/2003 | Scarborough | | 114/363 |
| 6,843,384 B2 * | 1/2005 | Schmidt et al. | | 220/4.13 |
| 2009/0120344 A1 * | 5/2009 | Dickman | | 114/263 |

OTHER PUBLICATIONS

Jackson Riviera Sit-on-top Kayak, 2 pages, Jun. 6, 2009.

* cited by examiner

*Primary Examiner* — Stephen Avila
(74) *Attorney, Agent, or Firm* — Alleman Hall McCoy Russell & Tuttle LLP

(57) ABSTRACT

Embodiments are disclosed that relate to the efficient reinforcement of molded kiss-offs in a kayak. For example, one disclosed embodiment provides a personal self-propelled watercraft comprising a unitary molded plastic body comprising a hull and a seat, a kiss-off connecting two proximate surfaces of the self-propelled watercraft, and a plastic reinforcing structure welded within an interior of the kiss-off.

10 Claims, 3 Drawing Sheets

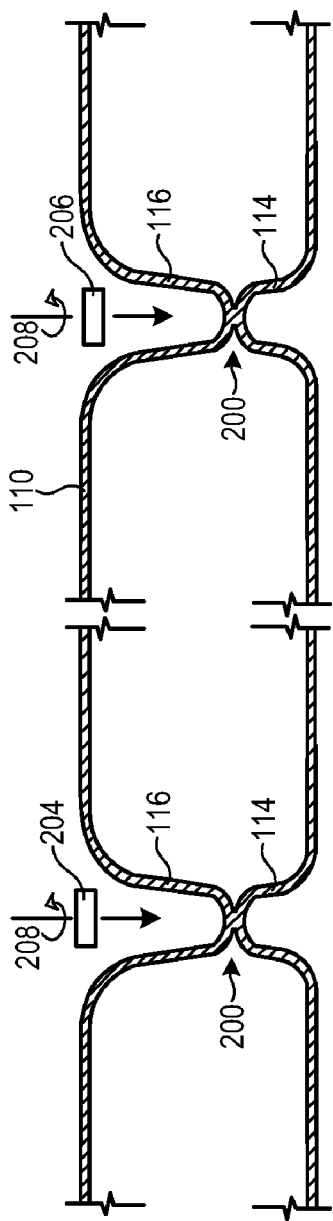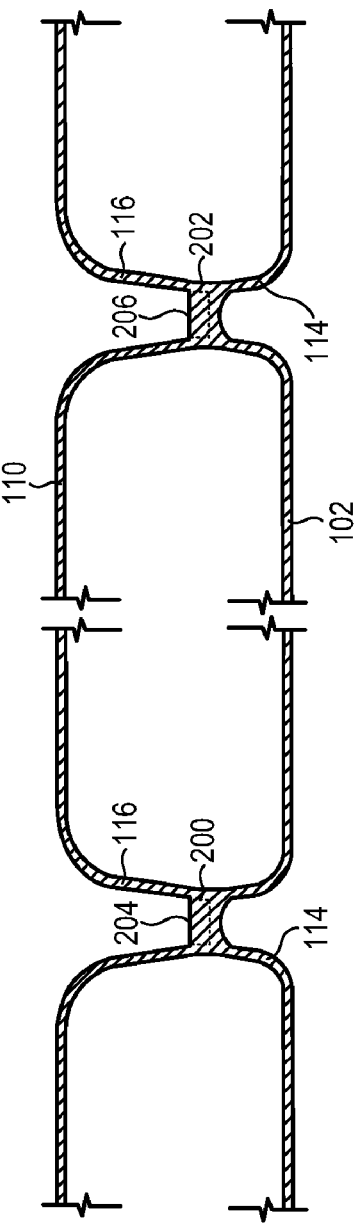

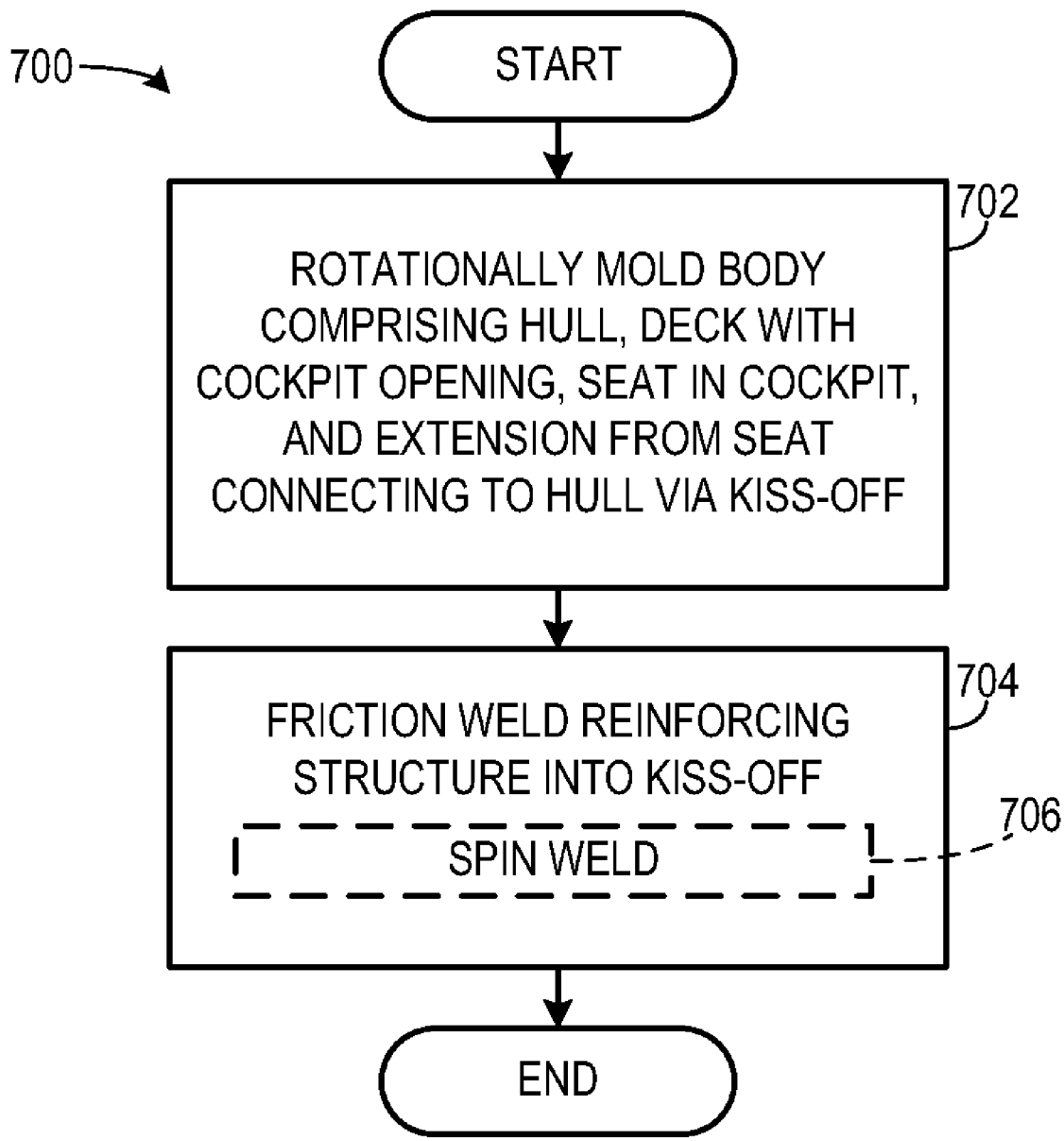

REINFORCEMENT OF KISS-OFF IN ROTATIONALLY MOLDED WATERCRAFT

BACKGROUND

Self-propelled watercraft, such as canoes and kayaks, may be manufactured in a variety of ways. For example, some plastic watercraft may be made via rotational molding. Rotational molding involves melting a plastic in a heated mold cavity, and then rotating the mold cavity while cooling the cavity to thereby coat the cavity with polymer as it cures or otherwise solidifies.

Rotational molding of a kayak allows a deck and hull of a canoe or kayak to be formed as a single unitary structure. Further, in some situations, a canoe or kayak seat may also be formed integrally with the deck and hull in a single rotational molding process. For example, in a recreational sit-in kayak (i.e. a kayak having a deck with an open cockpit in which a user sits), an integrally molded seat may extend downward from each side of the cockpit into the cockpit opening.

To provide further support for an integrally molded seat, a watercraft mold may be designed such that one or more kiss-offs are formed between a bottom surface of the seat and an interior surface of the hull during rotational molding. A kiss-off is a bridging structure formed during rotational molding at locations where two mold surfaces come in close proximity but do not contact one another. Plastic deposited on the two mold surfaces can flow together to create the kiss-off structure due to the close proximity of the mold surfaces.

Various difficulties may be encountered when forming kiss-offs in a rotationally molded watercraft. For example, a kiss-off used for structural reinforcement, such as a kiss-off extending between a seat and hull, may be difficult to form with a thick enough wall to withstand repeated stresses and/or to reproducibly meet desired manufacturing tolerances.

SUMMARY

Accordingly, various embodiments are disclosed herein that relate to the efficient reinforcement of molded kiss-offs in a rotationally molded watercraft. For example, one disclosed embodiment provides a rotationally molded personal self-propelled watercraft comprising a unitary molded plastic body having a hull and a seat. The watercraft also comprises a kiss-off connecting two proximate surfaces of the self-propelled watercraft, and a plastic reinforcing structure welded within an interior of the kiss-off.

Another embodiment provides a method of making a kayak. The method comprises rotationally molding a unitary body having a hull, a deck with a cockpit opening, a seat extending from the deck into the cockpit opening, and a kiss-off extending from the seat and connecting to the hull; and then friction welding a reinforcing structure into an interior of the kiss-off.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 shows a sectional view of the seat and hull of the embodiment of FIG. 1, and illustrates embodiments of two reinforcing structures prior to being welded into respective kiss-offs.

FIG. 3 shows the two reinforcing structures of FIG. 2 welded into the respective kiss-offs.

FIG. 7 shows a flow diagram depicting an embodiment of a method for manufacturing a kayak.

DETAILED DESCRIPTION

As described above, the formation of kiss-offs having desired geometrical and strength properties for such structural uses as supporting a seat in a rotationally molded personal watercraft may pose various challenges. For example, it may be difficult to form a kiss-off with a thick enough wall to withstand repeated uses by a heavy paddler, to withstand repeated impacts of a kayak hull against objects such as rocks, etc. Further, because the geometry of a kiss-off may be dependent upon a relatively large number of process variables other than mold geometry, challenges may be encountered in reproducibly forming kiss-offs within desired manufacturing tolerances.

Accordingly, embodiments are disclosed herein that relate to the efficient reinforcement of kiss-offs in a rotationally molded watercraft. Generally, the disclosed embodiments utilize friction welding to weld a reinforcing structure to a location within an interior of a kiss-off to strengthen the kiss-off. The use of friction welding, such as spin-welding, to secure a reinforcing structure within a kiss-off allows the reinforcing structure to be quickly and easily installed after molding. For example, an ordinary router or drill may be used to spin-weld a plastic disk reinforcing structure into a kiss-off, thereby greatly increasing the strength and impact resistance of the kayak seat assembly with little additional manufacturing time and cost. Further, the formation of a welded joint between the reinforcing structure and the interior of the kiss-off helps to ensure the structural integrity of the assembly compared to other potential methods of reinforcing a kiss-off, such as fixing a reinforcing structure in a kiss-off via an adhesive.

Figure 1:
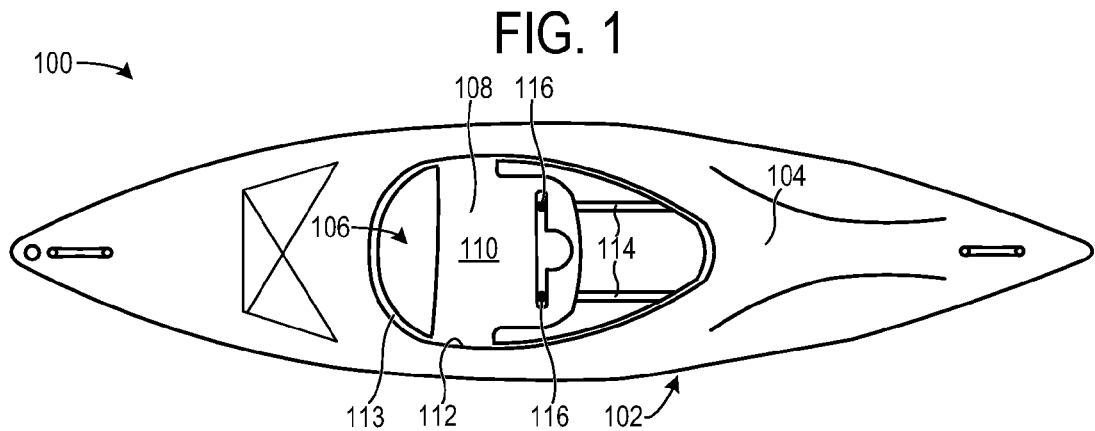
FIG. 1 shows an embodiment of a rotationally molded watercraft comprising a seat supported via a molded kiss-off that connects to a hull.

FIG. 1 shows an embodiment of a rotationally molded self-propelled watercraft in the form of a recreational sit-in kayak 100. Kayak 100 comprises a unitary body having a hull 102 and a deck 104 including a cockpit 106 configured to accommodate a seated paddler. Further, kayak 100 comprises a seat 108 molded integrally with the hull 102 and deck 104. In the depicted embodiment, the seat 108 includes a seating surface 110 supported by a pair of opposing side supports 112 that each extend downwardly from a rim 113 of the cockpit. However, it will be understood that an integrally molded seat may be connected to the deck in any other suitable manner.

An interior surface of hull 102 comprises a pair of stiffening rails 114 configured to strengthen the hull against deflection. In other embodiments, other suitable configurations of rails may be used, or such rails may be omitted.

Seat 108 further comprises a plurality of extensions 116 that extend from the seating surface 110 toward an inner surface of hull 102 to form kiss-offs with the hull at stiffening rails 114. FIG. 2 shows a sectional view of the kayak 100 taken along line 2-2 of FIG. 1, and illustrates two kiss-offs at 200 and 202. It will be understood that a kayak seat may include any suitable number of extensions to form any suitable number of kiss-offs with a hull. For example, in some embodiments, a seat may include four kiss-offs, such that two kiss-offs support a front portion of the seat and two kiss-offs support a rear portion of the seat. In other embodiments, any other suitable number of kiss-offs may be used. While described herein in the context of a kiss-off between a seat and a hull, it will be understood that a kiss-off may be used between any desired structures within a rotationally molded watercraft where structural support is desired. In general, a kiss-off may be formed in any suitable location by using a mold configured to form two proximate surfaces on the watercraft close enough together for the plastic on each surface to flow together (e.g. through the use of one or more extensions similar to extensions 116 of FIG. 1).

FIG. 2 depicts example embodiments of reinforcing structures 204, 206 positioned respectively above kiss-off 200, 202 to be welded into the interiors of kiss-offs 200, 202. FIG. 3 depicts an example of a resulting structure for kiss-offs 200, 202 after the reinforcing structures are welded into the kiss-offs. Referring first to FIG. 2, it can be seen that the depicted unreinforced kiss-offs 200, 202 have a relatively narrow, hourglass-shaped profile, with a potentially weak joint at the waist of the hourglass shape.

Referring next to FIG. 3, it can be seen that the welding of the reinforcing structures 204, 206 into the kiss-offs thickens the waist of the kiss-offs in both a vertical and horizontal direction. This thicker profile may help to increase the resistance of the kiss-offs to damage caused by stresses and impacts. It will be understood that the specific structures shown in FIGS. 2 and 3 are depicted for the purpose of example, and are not intended to be limiting in any manner.

The reinforcing structures 204, 206 may be welded into kiss-offs 200, 202 in any suitable manner. For example, as mentioned above, the reinforcing structures 204, 206 may be friction welded into the kiss-offs 200, 202. Friction welding involves the use of friction to generate sufficient heat between two compatible polymer surfaces for the polymer matrices of the surfaces to grow together. Friction welding techniques differ by the type of motion used to create frictional heat. For example, orbital and linear friction welding respectively use orbital and linear motion between surfaces to create heat. Likewise, spin welding utilizes rotational motion between surfaces to generate heat. This is illustrated by arrows 208 in FIG. 2. Spin welding may be well-suited for installing circularly-shaped (e.g. disk-shaped) reinforcing structures 204, 206 into kiss-offs 200, 202. As mentioned above, spin welding also may be relatively low-cost to implement. For example, a disk-shaped reinforcing structure may be configured to connect to a suitable bit for a router or drill, thereby allowing the reinforcing structures to be friction welded into the kiss-offs via a router or drill. However, it will be understood that any other suitable friction welding method may be used.

Figure 4:
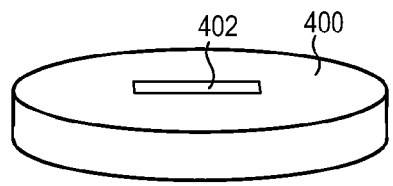
FIG. 4 shows another embodiment of a reinforcing structure for a kiss-off.
Figure 5:
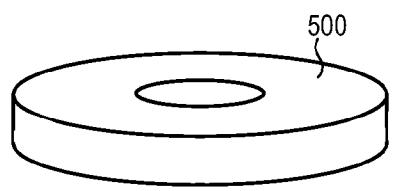
FIG. 5 shows another embodiment of a reinforcing structure for a kiss-off.
Figure 6:
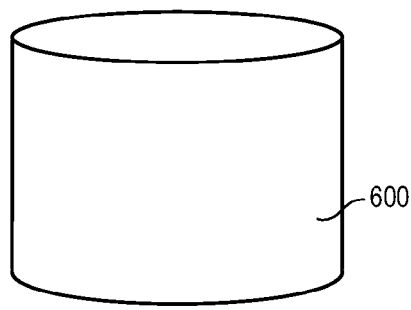
FIG. 6 shows another embodiment of a reinforcing structure for a kiss-off.

FIGS. 4-6 show various non-limiting examples of reinforcing structures suitable for installation in a kiss-off via spin welding. First, FIG. 4 shows a reinforcing structure 400 in the form of a solid, plastic disk. The reinforcing structure 400 includes a connecting structure in the form of a slot 402 configured to be coupled to a complementary connecting structure on a spin-welding tool, such as a complementary bit on a router or drill. However, it will be understood that the reinforcing structure 400 may include any other suitable structure configured to connect to a complementary structure on a welding tool. The reinforcing structure 400 likewise may have any suitable dimensions. For example, where the reinforcing structure is to be installed in a kiss-off having a round cross-sectional area, the outer diameter of the reinforcing structure 400 may be configured to match an inner diameter of a kiss-off at the location within the kiss-off at which reinforcement is desired. Likewise, where the reinforcing structure 400 is to be installed in a kiss-off having a square or other non-circular shape, the diameter of the reinforcing structure 400 may be matched to a smallest cross-sectional dimension of the interior of the kiss-off at the location at which reinforcement is desired. It will be understood the reinforcing structure 400 may have any suitable shape and thickness depending upon the geometry of a kiss-off within which the reinforcing structure 400 is to be welded, and/or the desired final geometry of the reinforced kiss-off.

FIGS. 5 and 6 shows other embodiments of reinforcing structures. First, FIG. 5 shows an embodiment of a reinforcing structure 500 having an annular shape. Next, FIG. 6 shows an embodiment of a reinforcing structure 600 having a rod-like shape. Annular reinforcing structure 500 may be used, for example, where it is desired to thicken a side wall of a kiss-off yet maintain a hollow structure in the kiss-off, while rod-shaped reinforcing structure 600 may be used, for example, where it is desired to form a kiss-off having a substantially solid cross-sectional profile along an axial length of the molded extension that forms the kiss-off. It will be understood that the specific embodiments of reinforcing structures described herein are shown for the purpose of example, and are not intended to be limiting in any manner.

FIG. 7 shows a flow diagram depicting an embodiment of a method 700 for making a kayak. Method 700 comprises, at 702, rotationally molding a kayak body comprising a hull, a deck with a cockpit opening, a unitary seat positioned within the cockpit opening, and an extension extending from the seat toward an inner surface of the hull to form a kiss-off with the hull. Any suitable number of kiss-offs may be formed between the seat and the hull. For example, in some embodiments, two kiss-offs may be formed between the hull and the seat, wherein one kiss-off supports each side of the seat. In other embodiments, either fewer or more kiss-offs may be used.

Next, method 700 comprises, at 704, friction welding a reinforcing structure into an interior of the kiss-off. Any suitable friction welding method may be used. For example, as indicated at 706, the reinforcing structure may be welded in the interior of the kiss-off via spin welding. As mentioned above, spin welding may allow the friction weld to be formed with an ordinary router or drill, and therefore may allow the installation of the reinforcing structure with little additional manufacturing time and expense. In other embodiments, other suitable friction welding methods may be used. Whatever the friction welding method and tool used, the resulting reinforced kiss-off may be more resistant to fatigue and/or failure from repeated use, sharp impacts, and other such use conditions, and therefore may help to improve the lifetime of the kayak.

It is to be understood that the specific embodiments of kayaks, kiss-offs, reinforcing structures, and methods for reinforcing kiss-offs in a kayak described herein are presented for the purpose of example, and that these specific embodiments or examples are not to be considered in a limiting sense, because numerous variations are possible. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A personal self-propelled watercraft, comprising:
a unitary molded plastic body comprising a hull, a seat, and a kiss-off connecting the hull and the seat, the kiss-off having an interior and also having a waist at a joint where proximate surfaces of the hull and the seat meet; and
a circular plastic reinforcing disk attached via a weld to the unitary molded plastic body within the interior of the kiss-off at the joint where the proximate surfaces of the hull and the seat meet,
wherein the watercraft is a kayak comprising a deck and a cockpit, wherein the seat is positioned within the cockpit, wherein the hull comprises a stiffening rail, and wherein the kiss-off extends between the seat and the stiffening rail of the hull.

2. The watercraft of claim 1, wherein the circular plastic reinforcing disk comprises an annular structure.

3. The watercraft of claim 1, further comprising a plurality of kiss-offs extending between the seat and the hull, wherein each kiss-off comprises an interior with a plastic reinforcing structure welded therein.

4. The watercraft of claim 1, wherein the kiss-off comprises an hourglass shape, and wherein the joint is located at a waist of the hourglass shape.

5. A method of making a kayak, comprising:
rotationally molding a unitary body, the body comprising a hull comprising a stiffening rail, a deck with a cockpit opening, and a seat positioned in the cockpit;
during rotationally molding, forming a kiss-off between the stiffening rail of the hull and the seat such that the kiss-off comprises a joint where proximate surfaces of the seat and the stiffening rail meet; and
after rotationally molding the unitary body and forming the kiss-off, friction welding a reinforcing structure into an interior of the kiss-off by spin-welding a circular plastic reinforcement into the kiss-off at the joint where the proximate surfaces of the seat and the stiffening rail meet.

6. The method of claim 5, wherein friction welding the reinforcing structure into the interior of the kiss-off comprises friction welding a plastic disk into the interior of the kiss-off.

7. The method of claim 5, wherein the body comprises a plurality of extensions extending from the seat and connecting to the hull to form a plurality of kiss-offs, and wherein the method further comprises welding a reinforcing structure into each kiss-off.

8. The method of claim 5, wherein friction welding the reinforcing structure into the interior of the kiss-off comprises friction welding an annular structure into the interior of the kiss-off.

9. The method of claim 5, wherein welding the reinforcing structure into the interior of the kiss-off comprises friction welding a rod-shaped structure into the interior of the kiss-off.

10. The method of claim 5, wherein spin welding the reinforcing structure into an interior of the kiss-off comprises utilizing a router or drill to spin weld the reinforcing structure into the interior of the kiss-off.

* * * * *